United States Patent
Scranton, Jr.

(10) Patent No.: US 6,221,277 B1
(45) Date of Patent: Apr. 24, 2001

(54) COMPOSITION FOR REMOVING SULFUR COMPOUNDS FROM FLUIDS

(75) Inventor: Delbert C. Scranton, Jr., Chesterfield, MO (US)

(73) Assignee: The SulfaTreat Company, Chesterfield, MO (US)

( * ) Notice: Subject to any disclaimer, the term of this patent is extended or adjusted under 35 U.S.C. 154(b) by 0 days.

(21) Appl. No.: 09/024,667

(22) Filed: Feb. 17, 1998

Related U.S. Application Data

(60) Provisional application No. 60/038,061, filed on Feb. 18, 1997.

(51) Int. Cl.[7] .................................... C09K 3/00; C09K 3/32
(52) U.S. Cl. ................................ 252/182.11; 252/182.33; 423/242.7; 423/243.07; 423/244.06; 423/592; 423/622; 423/632; 208/238; 208/244; 208/247; 210/749; 210/758
(58) Field of Search .......................... 423/242.7, 243.07, 423/244.06, 592, 622, 632, 242.1; 208/238, 244, 247; 252/182.11, 182.33; 564/503, 504, 505, 511, 512; 210/749, 758

(56) References Cited

U.S. PATENT DOCUMENTS

| | | | |
|---|---|---|---|
| 4,113,606 | * | 9/1978 | Mulaskey ............................ 208/244 |
| 4,224,170 | * | 9/1980 | Haugen ............................ 252/32.7 E |
| 5,792,438 | * | 8/1998 | Scranton, Jr. .................... 423/244.02 |

FOREIGN PATENT DOCUMENTS

| | | | | |
|---|---|---|---|---|
| 48-11321 | * | 4/1973 | (JP) ..................................... | 208/244 |
| 53-12905 | * | 2/1978 | (JP) ..................................... | 208/244 |

OTHER PUBLICATIONS

Grant et al. "Grant and Hackh's Chemical Dictionary" 5th ed., McGraw Hill Book Co. USA ISBN 0–07–024067–1 p. 564, 1987.*

* cited by examiner

Primary Examiner—Steven P. Griffin
Assistant Examiner—Timothy C Vanoy
(74) Attorney, Agent, or Firm—Polsinelli Shalton & Welte, P.C.

(57) ABSTRACT

The present invention relates to an activated metal oxide and methods for removing sulfur compounds from fluids, whereby the activated metal oxide includes an amount of metal oxide and an amount of ethoxylated fatty amine, with the ethoxylated fatty amine increasing the rate of reactivity between the metal oxide and the sulfur compounds, which include hydrogen sulfide, carbonyl sulfide, mercaptans, and other organic sulfides. The ethoxylated tallow amines include ethoxylated tallow amine, ethoxylated cocoa amine, ethoxylated oleic amine, ethoxylated soya amine, ethoxylated palmatic amine, ethoxylated steric amine, and combinations thereof. The method involves activating the metal oxide, preferably iron oxide or zinc oxide, with an amount of ethoxylated fatty amine so that when fluids, such as water or liquid hydrocarbons, contact the metal oxide the sulfur compounds are removed.

9 Claims, No Drawings

COMPOSITION FOR REMOVING SULFUR COMPOUNDS FROM FLUIDS

This application claims the benefit of U.S. Provisional Application Ser. No. 60/038,061 filed Feb. 18, 1997.

FIELD OF INVENTION

The present invention relates to an activated metal oxide composition comprised of an amount of metal oxide and an amount of ethoxylated fatty amine so that the rate of reaction between the metal oxide composition and reactive sulfur species compounds found in a fluid is increased. The present invention also relates to methods for increasing the rate of removal of sulfur compounds from fluids by adding the ethoxylated fatty amine to the metal oxide thereby increasing the rate of reaction between the metal oxide and the reactive sulfur species compounds.

BACKGROUND OF THE INVENTION

It has been known to use metal oxides, and especially iron oxides, to remove sulfur compounds, such as hydrogen sulfide, carbonyl sulfide, and mercaptans, from fluids, and in particular various liquids, such as water and hydrocarbon liquids. It has also been known to try and increase the reactivity of the iron oxides with the sulfur compounds by adding a catalyst or activator thereto. Most catalysts and activators, however, are solid and have to be physically mixed in with the iron oxide, which can be cumbersome and difficult in pre-existing iron oxide beds. The catalysts and activators often cannot be added to the liquid or fluid being treated by the iron oxide. Further, most catalysts and activators have to be added at a specific point for the reaction to occur. What this means is that most activators or catalyst must be added to the metal oxide prior to contact with the contaminant, not at any point so long as the metal oxide, activator, and sulfur compound contaminant contact each other. Thus, it is desired to have an activator that increases the reactivity of the metal oxide, and especially iron oxide or zinc oxide, and can be added to either the metal oxide, the fluid being treated, or a fluid metal oxide composition so that the fluid and metal oxide are in contact and the activator is then added.

Sulfur removal beds made of metal oxide, especially iron oxide, have traditionally had a fairly limited bed life, so that more than trace amounts of the sulfur compounds break through the iron oxide bed the usefulness of the bed is terminated. In other words, when more than trace amounts of the sulfur compounds pass through the iron oxide bed without reacting with the iron oxide bed material the life of the iron oxide bed is terminated and the iron oxide in the bed must be replaced. Keep in mind that sulfur breakthrough typically involves more than trace amounts of sulfur compounds and that breakthrough occurs even though there is a large amount of unreacted metal oxide that could react with the sulfur compounds and prevent breakthrough. Replacement of the metal oxide or iron oxide bed material can be expensive and a difficult procedure to perform. As such, it is desired to have a method or composition for increasing the reactivity rate between the metal oxide and the sulfur compounds, so that the metal oxide bed life can be extended. It is especially desired to have a method or composition that can be added to the metal oxide and that ensures a greater amount of metal oxide will be reacted before breakthrough.

Methods for increasing the reactivity of the metal oxide bed with the sulfur compounds to prevent breakthrough are known and have included the addition of oxygen or air to the metal oxide bed or heating the metal oxide bed to temperatures greater than 500° Celsius (C). The addition of oxygen or air is disadvantageous because the oxygen is highly reactive and can be dangerous. Heating the metal oxide is also disadvantageous because it is relatively expensive to heat the metal oxide bed and the heated metal oxide bed can also be dangerous because of the high temperatures involved. It would be beneficial to have a method or composition which could be used to increase the reactivity of metal oxides with sulfur compounds, especially in metal oxide beds where breakthrough of the sulfur compounds has occurred. It is also desirable to have a method or composition that initially increases the reaction rate between the metal oxide and sulfur compounds so that the metal oxide bed life can be prolonged. Thus, it would be desirable to have an activator that is safe and can be easily used, and that ensures that the majority of the metal or iron oxide in a reactor bed has reacted with the sulfur compounds.

Finally, it has been unknown to use ethoxylated fatty amines to activate metal oxides and increase the rate of reactivity between the metal oxides and the sulfur compounds. In particular it has been unknown to use ethoxylated fatty amines to activate iron oxide beds used in the removal of sulfur compounds from fluids, especially liquids. Other activators are known to be used in combination with iron oxide compositions, but the use of an ethoxylated fatty amine as an activator to increase reactivity between a metal oxide and reactive sulfur species is unknown. The use of an ethoxylated fatty amine to increase a metal oxide bed's reactivity is unknown.

SUMMARY OF THE INVENTION

The present invention relates to a metal oxide composition activated with an amount of ethoxylated fatty amine and methods for activating the metal oxide. Specifically, the present invention relates to adding an amount of ethoxylated fatty amine to a metal oxide, such as iron oxide, so as to increase the rate of reaction between the metal oxide and sulfur compounds found in fluids, including gases and liquids. The ethoxylated fatty amine can be added to the metal oxide directly or can be added to a liquid contaminated with a reactive sulfur species prior to contact with the metal oxide. In fact, the ethoxylated fatty amine can be added to the metal oxide at any point so long as the metal oxide, ethoxylated fatty amine, and reactive sulfur compounds are in contact at the same time.

As mentioned, it has been known to catalyze or activate metal oxides to increase the reactivity of a metal oxide with sulfur compounds found in fluids. Normally, however, catalysts or activators are added which are solid and must be mixed with the metal oxide prior to placement in a reactor vessel, or they are highly reactive or expensive to use. The use of the ethoxylated fatty amine is advantageous because it is liquid and can be added at any point to the metal oxide, meaning the ethoxylated fatty amine can be added to the metal oxide prior to placement in a reactor vessel, after placement in a reactor vessel, after most of the metal oxide in the reactor vessel has been reacted, with a liquid contaminated with sulfur prior to entry into the reactor vessel and contact with the metal oxide, or with a liquid prior to, or simultaneous with, contact with a gas contaminated with sufur compounds. Also, the ethoxylated fatty amine is safe to use and relatively inexpensive.

Not only can the ethoxylated fatty amine be easily added to the metal oxide, but the ethoxylated fatty amine can be used to greatly increase the reactivity of the metal oxide with sulfur compounds. The ethoxylated fatty amine can also be added in an amount that only slightly increases the reactivity of the metal oxide with the sulfur compounds. By adding a small amount of ethoxylated fatty amine, less than at least 1 part by weight of the ethoxylated fatty amine to 1 part by weight of reactive sulfur species in the liquid, the life of a metal oxide reaction bed can be extended and in some cases a bed with sulfur breakthrough can be revived and reused. Importantly, as more ethoxylated fatty amine is added to the metal oxide the rate of reactivity between the metal oxide and the sulfur compounds is increased. What this means is that the ethoxylated fatty amine is an activator and that, when everything else is kept constant, the reactivity of the metal oxide is based primarily on the amount of ethoxylated fatty amine contacted with the metal oxide. While small amounts can be added to slightly increase the reactivity of the metal oxide it is more preferred to add enough ethoxylated fatty amine to the metal oxide to increase the reaction rate between the metal oxide and the sulfur compounds by a factor of 1.5. Regardless of how much ethoxylated fatty amine is added, the addition of the ethoxylated fatty amine is beneficial because it increases reactivity and can be used to revive a reactor bed of metal oxide where sulfur has broken through or to increase the efficiency of a reactor bed that is still in operation. Thus, the present invention is desirable because the ethoxylated fatty amine can be added to metal oxide in a variety of forms to increase reactivity between the metal oxide and the sulfur compounds. Importantly, the present invention is safe and only small amounts of the ethoxylated fatty amine have to be added to increase reactivity, so that the amount of ethoxylated fatty amine added is dependent in part on how much the user wants to increase the reactivity.

Ethoxylated fatty amines are preferred, but other amines can be used to promote reactivity between the metal oxide and sulfur compounds. Also, while iron oxide is the preferred metal oxide other metal oxides can be used such as zinc oxide and other row four (4) and five (5) metal oxides.

DETAILED DESCRIPTION

The present invention relates to methods and compositions for increasing the rate of reactivity between metal oxides and sulfur compounds found in fluids. More specifically, the present invention relates to increasing the rate of reaction between the metal oxide and the sulfur compounds by adding an ethoxylated fatty amine to, for example, either a liquid prior to contact with the metal oxide or by adding the ethoxylated fatty amine directly to the metal oxide. It does not, however, matter when the ethoxylated fatty amine is added to the metal oxide, as long as the metal oxide, ethoxylated fatty amine, and reactive sulfur species contact one another at the same time. The ethoxylated fatty amine, because it increases the rate of reaction between the metal oxide and sulfur compounds, allows for the use of a lesser amount of metal oxide when treating liquids contaminated with sulfur compounds. Further, the ethoxylated fatty amine increases the efficiency with which the metal oxide reacts with the sulfur compounds or reactive sulfur species. The ethoxylated fatty amine also allows for use of metal oxide beds which are considered spent because a breakthrough of sulfur has occurred; meaning the ethoxylated amine can be used to revive the metal oxide bed, having an amount of unreacted metal oxide, so it can be used again or to increase the bed life of the metal oxide.

The method for removing the sulfur compounds from the fluids is preferably initiated by forming an activated metal oxide composition. The activated metal oxide composition is comprised of an amount of metal oxide an and amount of ethoxylated fatty amine, which is preferably added to a liquid being treated or directly to the metal oxide or to a liquid metal oxide combination. It is also preferred if the metal oxide is selected from the group consisting of zinc oxide and iron oxide, however, other row 4 and 5 metal oxides can be used. If the iron oxide is selected it will be expressed by the formula $Fe_xO_y$, where x is equal to between 1 and 3 and y is equal to between 1 and 4. Most preferably, the metal oxide is an iron oxide that is selected from the group consisting of FeO, $Fe_2O_3$, $Fe_3O_4$, and mixtures thereof. The iron oxide is preferably chosen because it is typically used in commercial hydrocarbon cleaning systems to remove sulfur compounds, especially $H_2S$, from hydrocarbon fluids and has shown to be effective when combined with the ethoxylated fatty amine to remove sulfur compounds. Thus, the iron oxide is readily available for use and advantageously the present method and composition can be used with existing sulfur removal systems. Again, while the iron oxide is the preferred metal oxide, other metal oxides can be used such as zinc oxide.

The metal oxide can be in powdered form, slurried form, placed in a liquid, coated onto an inert substrate, extruded, or formed into a pelletized material. If the metal oxide is in a solid form, such as powdered or pelletized it can be placed in a reactor vessel and liquids contaminated with sulfur compounds can be passed through the metal oxide bed. If the metal oxide is in a slurried form, liquids can be mixed with the metal oxide slurry and then the liquids, after sufficient reaction time, can be separated from the slurry or the slurry and contaminated liquid can be disposed of together. Also, gases and fluids contaminated with sulfur compounds can be passed through a slurry and the gas or fluid can then be separated after a sufficient time for reaction between the metal oxide and the sulfur compounds. Regardless of how the metal oxide is contacted with the sulfur compounds if the metal oxide has an amount of ethoxylated fatty amine added thereto the reaction rate between the metal oxide and the sulfur compounds will be increased. As such, the life of the metal oxide is extended. The amount of metal oxide, particularly iron oxide, does not matter as long as enough metal oxide is placed in a reaction vessel or similar structure to adequately remove sulfur compounds from liquids for a sufficient period of time. Consequently, the amount of metal or iron oxide added, or already in place, should be enough to essentially fill a reactor vessel or holding container. At least enough metal oxide must be added or be present to equal a ratio of 1 part by weight of metal oxide to 1 part by weight of reactive sulfur species contaminant in the fluid.

An amount of ethoxylated fatty amine is added to the metal oxide so as to activate the metal oxide and increase the rate of reaction between the metal oxide and the sulfur compounds found in the fluids. The ethoxylated fatty amine will promote an increased reaction between the metal oxide and sulfur compound regardless of whether most of the metal oxide has been reacted or none of the metal oxide has been reacted. The ethoxylated fatty amine is expressed by the formula $H(OC_xH_{2x})_yN_zR$, with x equal to between 2 and 3, y equal to between 1 and 20, z equal to between 1 and 3, and R equal to a fatty carbon chain of a length equal to between 10 and 22 carbon atoms. When added to the metal oxide the ethoxylated fatty amine causes an increased rate of reaction between the metal oxide and the sulfur compounds, so that the reaction is a reaction of first order dependent upon the addition of the ethoxylated fatty amine. While a variety of ethoxylated fatty amines can be used, and even in some cases non-ethoxylated fatty amines, to activate the metal oxide, the most preferred ethoxylated fatty amine is selected from the group consisting of ethoxylated tallow amine, ethoxylated cocoa amine, ethoxylated oleic amine, ethoxylated palmatic amine, ethoxylated steric amine, ethoxylated soya amine, other ethoxylated fatty acid amines, and mixtures thereof. Other ethoxylated fatty amines available for use include surfactants mixed with amines.

The ethoxylated fatty amine should preferably be added in an amount sufficient to increase the rate of the reaction between the metal oxide and the sulfur compounds by a factor of at least 1.5. More preferably, an amount of ethoxylated fatty amine is added so that a ratio of at least 0.25:1 of ethoxylated fatty amine to sulfur compounds by weight is present. While this ratio is preferred it is not required as the amount of ethoxylated fatty amine added will be dependent upon the time for reaction between the sulfur compounds and the metal oxide, the amount of metal oxide and the amount of sulfur compounds, the size of the reactor vessel, the temperature, the rate at which the fluid contacts or passes over the metal oxide, and the level of activation of the metal oxide desired. It may not be necessary to add large quantities of ethoxylated fatty amine if it is only desired to slightly increase the reactivity of the metal oxide bed, as the ethoxylated fatty amine can be used to increase reactivity in a new bed or a bed that has allowed for a sulfur compound breakthrough.

As mentioned, the ethoxylated fatty amine can be added directly to the metal oxide or can be added to a liquid containing the sulfur compounds. Both ways of adding the ethoxylated fatty amine are equally effective. If the ethoxylated fatty amine is added to the metal oxide it should preferably be added prior to contact with the liquid or fluid. If the ethoxylated fatty amine is added to the liquid it should preferably be done prior to the liquid contacting the metal oxide. However, the most important point to remember is that the metal oxide, ethoxylated fatty amine, and sulfur compounds can be added or mixed together in any order as long as the three compounds contact one another together.

In addition to the ethoxylated fatty amine, an amount of metal oxide activator can be mixed with the metal oxide to form an activated metal oxide prior to contact with the ethoxylated fatty amine. The metal oxide activator, like the ethoxylated fatty amine, is added preferably in an amount sufficient to increase the rate of reaction between the metal oxide and the sulfur compounds by a factor of at least 1.5. As such, the ethoxylated fatty amine and the metal oxide activator can be used together to greatly increase the reactivity of the metal oxide. The metal oxide activator can be selected from a variety of compounds that are more noble than the metal oxide so that the metal oxide activator is a noble metal oxide. Among the preferred metal oxide activators are copper oxide and nickel oxide, with the copper oxide selected from the group consisting of cupric oxide and cuprous oxide. The copper oxide is the most preferred metal activator. The metal oxide activator and the metal oxide can be mixed in any container or mixing chamber that allows for thorough mixing of the two constituents and placement in the reactor vessel.

The sulfur compounds removed by the metal oxide activated with ethoxylated fatty amine are selected from the group consisting of hydrogen sulfide ($H_2S$), carbonyl sulfide (COS), mercaptans (RSH), other reactive sulfur species, and any other organic sulfides. Additionally, the present method and composition is designed to remove the sulfur compounds from contaminated liquids such as water, liquid hydrocarbons, alcohols, and glycols. But, other liquids can be cleaned by the metal oxide activated with the ethoxylated fatty amine including brine and pulp liquor from a paper production process. Also, the present methods and composition can be used to remove sulfur compounds from fluids, including gases and liquids. The reaction between the metal oxide and the sulfur compounds can occur at any pressure and at a temperature ranging between about 0° Celsius (C) and about 300° C.

The most preferred method for using the ethoxylated fatty amine activator involves adding an amount of the ethoxylated fatty amine to a liquid contaminated with a sulfur reactive species prior to contact with a metal oxide, preferably iron oxide. Most preferably, an amount of ethoxylated fatty amine is added to the liquid so that the constituents are combined in a ratio of 2 parts by weight iron oxide to 2 parts by weight of ethoxylated amine to 1 part by weight of $H_2S$ in the liquid, with the liquid being either water or hydrocarbon liquid. The amount of $H_2S$ in the liquid is determined prior to contact with the metal oxide. The iron oxide is preferably placed in a reactor vessel prior to contact with the liquid containing the sulfir compounds, especially $H_2S$, and the ethoxylated fatty amine. Additionally, it is even more preferred to add an amount of copper oxide to the iron oxide to further increase the reactivity of the iron oxide. Once the ethoxylated fatty amine composition is added to the liquid, the liquid contaminated with the sulfur compounds and containing the ethoxylated fatty amine is passed through the metal oxide, preferably iron oxide, and the sulfur compounds, especially $H_2S$, are reacted and removed from the liquid.

Typically, two (2) hours or less is sufficient to adequately remove the sulfur contaminants from the fluid when the fluid is passed through a reactor vessel containing a sufficient amount of metal oxide and ethoxylated fatty amine. This removal time is also dependent, of course, on the flow rate of the fluid, the level of contaminants in the fluid, and the final product specification.

It should be pointed out that the present method and composition work by adding an amount of ethoxylated fatty amine to a metal oxide, preferably iron oxide. The metal oxide reacts with sulfur contaminants at a certain rate so that this a reaction of first order. In order to increase the velocity or rate of reactivity between the metal oxide and the sulfur compound it is necessary to add an activator. Included among the possible activators are noble metal oxides, increased temperatures, the addition of air, and the addition of an ethoxylated fatty amine. In the present invention it is preferred to use an ethoxylated fatty amine to increase the rate of reaction between the metal oxide and the sulfur compounds. As such, the reaction of first order is dependent upon the addition of the ethoxylated fatty amine in order to increase the rate of reaction between the metal oxide and the sulfur compounds. What this means is that generally as an amount of ethoxylated fatty amine is added to the metal oxide the rate at which the metal oxide reacts with the sulfur compounds is increased by a particular factor. Presently, it is preferred to add enough ethoxylated fatty amine to increase the rate of reaction between the metal oxide and the sulfur compounds by a factor of at least 1.5. Consequently, the object of the present invention is to simply increase the efficiency with which a metal oxide reacts with a sulfur compound by adding a sufficient amount of ethoxylated fatty amine.

EXAMPLES

Example 1

To show that iron oxide activated with ethoxylated fatty amine results in the improved removal of hydrogen sulfide from a liquid and at a faster rate than iron oxide without the addition of ethoxylated fatty amine, a series of tests were conducted. The tests were performed in groups of six over three consecutive days. Each group of tests included a blank, an iron oxide composition without an activator, and an iron oxide composition with an activator. Also, one test included the addition of an activator without an iron oxide present in the sampling chamber. The specific compositions examined determined by analyzing the amount of $H_2S$ in the contaminated water and in the bead space above the water, which is the vapor space above the water. The readings showed how many parts per million (ppm) of sulfur contaminants were present in the head space and the water. It should also be pointed out that for every 1 ppm of $H_2S$ in the water there was approximately 30 ppm to 50 ppm of $H_2S$ in the head space. The results are as follows:

| | | HYDROGEN SULFIDE REMOVAL WITH IRON OXIDE IN WATER | | | | | | | |
|---|---|---|---|---|---|---|---|---|---|
| | | Addition Rate LB/LB H2S | | Two Hour Reading | | Six to Seven Hour Reading | | 22 Hour Reading | |
| | Surfactant | SULFASPUNGE | Surfactant | Dissolved | Headspace | Dissolved | Headspace | Dissolved | Headspace |
| 5/14/96 | | | | | | | | | |
| Blank | None | 0 | 0 | | | 5 | | 5 | |
| 2:1 | None | 2 | 0 | | | 3.5 | | 1 | |
| 5:1 | None | 5 | 0 | | | 4 | | 0 | |
| 10:1 | None | 10 | 0 | 5 | | 2 | | 0 | |
| 5/5:1 | CE-86 | 5 | 5 | 0 | | | | | |
| 5/5:1 | NP-10 | 5 | 5 | 4.5 | | 3 | | 0 | |
| 5/15/96 | | | | | | | | | |
| Blank | None | 0 | 0 | | 300 | | 280 | | |
| 2/2:1 | CE-86 | 2 | 2 | | 10 | | 0 | | |
| 5/5:1 | CE-86 | 5 | 5 | | 0 | | | | |
| 2/0.5:1 | CE-86 | 2 | 0.5 | | >120 | 5 | 280 | | 70 |
| 5/1.25:1 | CE-86 | 5 | 1.25 | 1 | 33 | | 0 | | |
| 0/5:1 | CE-86 | 0 | 5 | | 80 | Tr. | 20 | | 0 |
| 5/16/96 | | | | | | | | | |
| Blank | None | 0 | 0 | | 300 | | 100 | 0 | 0 |
| 1/1:1 | CE-86 | 1 | 1 | | >120 | | 20 | | 0 |
| 2/2:1 | CE-86 | 2 | 2 | | 20 | | 0 | | |
| 1/1:1 | TEA | 1 | 1 | | >120 | | >120 | | 100 |
| 2/2:1 | TEA | 2 | 2 | | >120 | | >120 | 1.5 | 75 |
| 2/2:1 | PN-430 | 2 | 2 | | 40 | | 0 | | |

Tr. = Trace
CE-86 = ethoxylated tallow amine
TEA = triethanol amine
NP-10 = ethoxylate nonylphenol
PN-430 = ethoxylated tallow amine in each of the tests are shown in column 1. The results obtained at different times are shown in the column to the right of the composition column. A variety of activators were compared and the iron oxide was a commercially available product entitled "SULFASPONGE" TM sold by The SulfaTreat® Company in St. Louis, Miss.

The blank was used to show the amount of hydrogen sulfide that would pass through the treatment process when the liquid was untreated. The liquid was water contaminated with $H_2S$. The use of iron oxide alone is signified in column 1 by the figure X:Y, with the use of an activator and iron oxide signified by X/Z:Y in column 1. Thus, X equals pounds of iron oxide to pounds of hydrogen sulfide Y found in the contaminated liquids. Z equals pounds of activator to pounds of iron oxide X. The tests were conducted on contaminated liquid water having a pH of approximately 7. The activator used was selected from a group of activators, which were ethoxylated tallow amine (CE-86), another commercially available ethoxylated tallow amine (PN430), ethoxylate nonylphenol (NP-10), and triethanol amine (TEA). The hydrogen sulfide in the liquid water was monitored in time periods of two (2), six to seven (6–7), and twenty two 22 hours. The amount of sulfur remaining was The enclosed chart shows that hydrogen sulfide ($H_2S$) can be removed from a contaminated water stream using only the "SULFASPONGE" TM iron oxide, which is a combination of $Fe_2O_3$ and $Fe_3O_4$. While the iron oxide results in the removal of hydrogen sulfide, it is a first order reaction and thus is a slow reaction taking generally six (6) to seven (7) hours to remove $H_2S$ as shown, for example on May 14, 1996 in rows 2:1 and 5:1. The chart also shows that when an activator surfactant, such as ethoxylated tallow amine (CE-86 or PN-430), is added to the iron oxide, the activation rate is increased, with the hydrogen sulfide being removed from the contaminated water stream in a shorter period of time, generally two (2) hours. This is clearly shown on May 14, 1996 row 5/5:1, CE-86, and May 16, 1996 row 2/2:1, PN-430. Thus, the tables demonstrate that an activator can be used to shorten the time required for removing sulfur from a liquid using the iron oxide. The tests also show that the efficiency of removal is increased and that presumably a lesser space is required to remove the hydrogen sulfide when using an activated oxide as compared to a non-activated iron oxide. Specifically, what was shown was that the reactivity of the metal oxide was increased when the ethoxylated fatty amine was added thereto.

It should be noted that the activator alone will react to some degree with the hydrogen sulfide. This is demonstrated at row 0/5: 1, which shows that trace amounts of $H_2S$ were dissolved after 6 to 7 hours, meaning some $H_2S$ reacted with the activator. Finally, a surfactant by itself does not appear to affect the reaction rate between the metal oxide and the sulfur compounds, as this was shown in May 14, 1996, row 5/5:1, NP-10 ethoxylate nonylphenol. An amine by itself also does not work, as this was shown May 16, 1996 rows 1/1:1 and 2/2:1, TEA triethanol amine. It is believed that the TEA formed a salt with the $H_2S$, but this was not important as the rate of reaction between the metal oxide and the sulfur compounds was not increased.

Thus, there has been shown and described a novel method and composition relating to use of ethoxylated fatty amines with metal oxide compositions which fulfill all the objects and advantages sought therefore. It is apparent to those skilled in the art, however, that many changes, variation, modification, and other uses and applications for the subject method and composition are possible, and also such changes, variations, modifications, and other uses and applications which do not depart from the spirit and scope of the invention are deemed to be covered by the invention which is limited only by the claims which follow:

What is claimed is:

1. An activated metal oxide composition for removing sulfur compounds from fluids, with said activated metal composition having a rate of reaction with the sulfur compounds that is a first order reaction, wherein said metal oxide composition comprises an amount of metal oxide that reacts with the sulfur compounds and an ethoxylated fatty amine that activates the metal oxide to form said activated metal oxide, wherein said ethoxylated fatty amine is $(H(OC_xH_{2x})_yN_zR$, with x equal to 2 or 3, y equal to between 1 and 20, z equal to between 1 and 3, and R equal to a fatty carbon chain having between 10 and 22 carbon atoms.

2. The activated metal oxide composition of claim 1 wherein said metal oxide is selected from the group consisting of zinc oxide, iron oxide, and combinations thereof, with said iron oxide composition of the formula $Fe_xO_y$, with x equal to 1, 2 or 3 and y equal to 1, 2, 3 or 4.

3. The activated metal oxide composition of claim 2 wherein said iron oxide is selected from the group consisting of FeO, $Fe_2O_3$, $Fe_3O_4$, and combinations thereof.

4. The activated metal oxide composition of claim 1 wherein said ethoxylated fatty amine is selected from the group consisting of ethoxylated tallow amine, ethoxylated cocoa amine, ethoxylated oleic amine, ethoxylated soya amine, ethoxylated palmatic amine, ethoxylated steric amine, and combinations thereof.

5. The activated metal oxide composition of claim 1 wherein said metal oxide composition has an activator metal composition added to said acitivated metal oxide composition, said activator metal composition selected from the group consisting of copper oxide and nickel oxide.

6. The activated metal oxide composition of claim 5 wherein said activator metal and said ethoxylated tallow amine are added in an amount sufficient to increase the rate of reaction between said activated metal oxide and the sulfur compounds by a factor of at least 1.5.

7. The activated metal oxide composition of claim 1 wherein said ethoxylated fatty amine is added to said metal oxide in an amount sufficient to increase the rate of reaction between said metal oxide and the sulfur compounds by a factor of at least 1.5.

8. The activated metal oxide composition of claim 1 wherein said metal oxide; said ethoxylated fatty amine and said sulfur compounds are present in the fluid in a weight ratio of 1:0.25:1.

9. The activated metal oxide composition of claim 1 wherein said metal oxide is selected from the group consisting of powdered metal oxide, slurried metal oxide, liquid metal oxide, extruded metal oxide, pelletized metal oxide or metal oxide coated on an inert substrate.

* * * * *

UNITED STATES PATENT AND TRADEMARK OFFICE
CERTIFICATE OF CORRECTION

PATENT NO. : 6,221,277 B1
DATED : April 24, 2001
INVENTOR(S) : Delbert C. Scranton, Jr.

It is certified that error appears in the above-identified patent and that said Letters Patent is hereby corrected as shown below:

Column 8,
Line 2, change "in the bead space above the water," to "in the -- head -- space above the water,"

Signed and Sealed this

Twentieth Day of November, 2001

Attest:

NICHOLAS P. GODICI
*Attesting Officer*     *Acting Director of the United States Patent and Trademark Office*